(12) United States Patent
Papp et al.

(10) Patent No.: US 6,439,422 B1
(45) Date of Patent: Aug. 27, 2002

(54) AUTOMATED PORTABLE MEDICATION RADIAL DISPENSING APPARATUS AND METHOD

(75) Inventors: Mary Anne Papp, 559 Aberdeen Rd., Frankfort, IL (US) 60423; Christopher Schmidt, Floyds Knobs, IN (US)

(73) Assignee: Mary Anne Papp, Frankfort, IL (US)

( * ) Notice: Subject to any disclaimer, the term of this patent is extended or adjusted under 35 U.S.C. 154(b) by 0 days.

(21) Appl. No.: 09/397,349

(22) Filed: Sep. 15, 1999

Related U.S. Application Data

(62) Division of application No. 09/280,109, filed on Mar. 26, 1999, now Pat. No. 6,234,343.

(51) Int. Cl.⁷ .................................................. G07F 11/00
(52) U.S. Cl. .......................................... 221/13; 221/82
(58) Field of Search ............................... 221/2, 7, 9, 13, 221/15, 82, 131, 132, 133, 123, 92; 700/231, 236, 237, 243

(56) References Cited

U.S. PATENT DOCUMENTS

| | | | |
|---|---|---|---|
| 3,143,207 A | | 8/1964 | Wagner |
| 3,329,080 A | | 7/1967 | Reach |
| 4,147,021 A | | 4/1979 | Kondo |
| 4,165,709 A | | 8/1979 | Studer |
| 4,176,762 A | | 12/1979 | Scalera et al. |
| 4,462,696 A | | 7/1984 | Yung et al. |
| 4,572,403 A | | 2/1986 | Benarova |
| 4,600,119 A | | 7/1986 | Olson |
| 4,695,954 A | * | 9/1987 | Rose et al. ................ 221/3 |
| 4,725,997 A | | 2/1988 | Urquhart et al. |
| 4,748,600 A | | 5/1988 | Urquhart |
| 4,768,177 A | | 8/1988 | Kehr et al. |
| 4,785,969 A | * | 11/1988 | McLaughlin ............. 221/2 |
| 4,785,981 A | | 11/1988 | Rodman |

(List continued on next page.)

OTHER PUBLICATIONS

ADDS inc.: VA and DOD Clinic Dispensing System Software (1998).

Telepharmacy: VA Pharmacy Finds Convenience in Vending Machines, Veterans Health System Journal, Sep., 1998, pp. 74–75.

European Search Report for European Patent Application EP 0030 2342.

Annex to European Search Report for EP 00 20 2342, including Abstract.

*Primary Examiner*—Kenneth W. Noland
(74) *Attorney, Agent, or Firm*—Vedder, Price, Kaufman & Kammholz

(57) ABSTRACT

A portable medication cartridge allows for both manual and automated dispensing of tablets or capsules of virtually all sizes through a radial dispensing apparatus. The cartridge may be sealed and encoded with medication and patient identification. A microprocessor controlled medication dispensing apparatus includes a cartridge magazine capable of holding a plurality of cartridges for the same or different patients. The portable medication dispensing apparatus and method detects patient identification data and activates a radial dispensing medication cartridge in response to verification of patient identification data. The radial dispensing medication cartridge may include, for example, a tablet tray having a plurality of tablet stalls with at least a partially open top and side. The tablet and tray accommodates different sizes and types of tablets or capsules. A temporary tablet retention band is removably attached to the table tray to keep the tablets tray from exiting the open side of the tablet tray until the tablet tray is suitably filled and later inserted into the dispensing medication cartridge. The medication is sequentially advanced and allowed to radially dispense through an open side of the tablet tray from the medication cartridge.

34 Claims, 7 Drawing Sheets

U.S. PATENT DOCUMENTS

| | | | |
|---|---|---|---|
| 4,847,764 A | * | 7/1989 | Halvorson .............. 364/415.02 |
| 4,872,591 A | | 10/1989 | Konopka |
| 4,911,327 A | | 3/1990 | Shepherd et al. |
| 4,933,873 A | | 6/1990 | Kaufman et al. |
| 4,953,745 A | * | 9/1990 | Rowlett, Jr. ................... 221/5 |
| 4,970,669 A | | 11/1990 | McIntosh et al. |
| 5,036,462 A | | 7/1991 | Kaufman et al. |
| 5,047,948 A | | 9/1991 | Turner |
| 5,084,828 A | | 1/1992 | Kaufman et al. |
| 5,102,008 A | | 4/1992 | Kaufman et al. |
| D328,133 S | | 7/1992 | Kaufman et al. |
| 5,159,581 A | | 10/1992 | Agans |
| 5,176,285 A | | 1/1993 | Shaw |
| 5,197,632 A | | 3/1993 | Kaufman et al. |
| 5,230,441 A | | 7/1993 | Kaufman et al. |
| 5,267,174 A | | 11/1993 | Kaufman et al. |
| 5,291,191 A | | 3/1994 | Moore |
| 5,329,459 A | | 7/1994 | Kaufman et al. |
| 5,335,816 A | | 8/1994 | Kaufman et al. |
| 5,367,505 A | | 11/1994 | Tsuchiya et al. |
| 5,392,952 A | | 2/1995 | Bowden |
| 5,400,301 A | | 3/1995 | Rackley |
| 5,408,443 A | | 4/1995 | Weinberger |
| 5,431,299 A | * | 7/1995 | Brewer et al. .................. 221/2 |
| 5,442,728 A | | 8/1995 | Kaufman et al. |
| 5,472,113 A | | 12/1995 | Shaw |
| 5,609,268 A | * | 3/1997 | Shaw ............................ 221/2 |
| 5,623,242 A | | 4/1997 | Dawson, Jr. et al. |
| 5,646,912 A | | 7/1997 | Cousin |
| 5,755,357 A | * | 5/1998 | Orkin et al. ................... 221/82 |
| 5,850,344 A | * | 12/1998 | Conkright ....................... 221/9 |
| 5,868,135 A | | 2/1999 | Kaufman et al. |
| 5,945,651 A | | 8/1999 | Chorosinski et al. |
| 5,963,136 A | | 10/1999 | O'Brien |
| 5,971,594 A | | 10/1999 | Sahai |
| 6,004,020 A | | 12/1999 | Bartur |
| 6,021,918 A | | 2/2000 | Dumont et al. |
| 6,138,865 A | | 10/2000 | Gilmore |
| 6,150,942 A | | 11/2000 | O'Brien |
| 6,155,454 A | | 12/2000 | George et al. |
| 6,161,095 A | | 12/2000 | Brown |
| 6,168,563 B1 | | 1/2001 | Brown |
| 6,198,383 B1 | | 3/2001 | Sekura et al. |
| 6,202,642 B1 | | 3/2001 | McKinnon et al. |

* cited by examiner

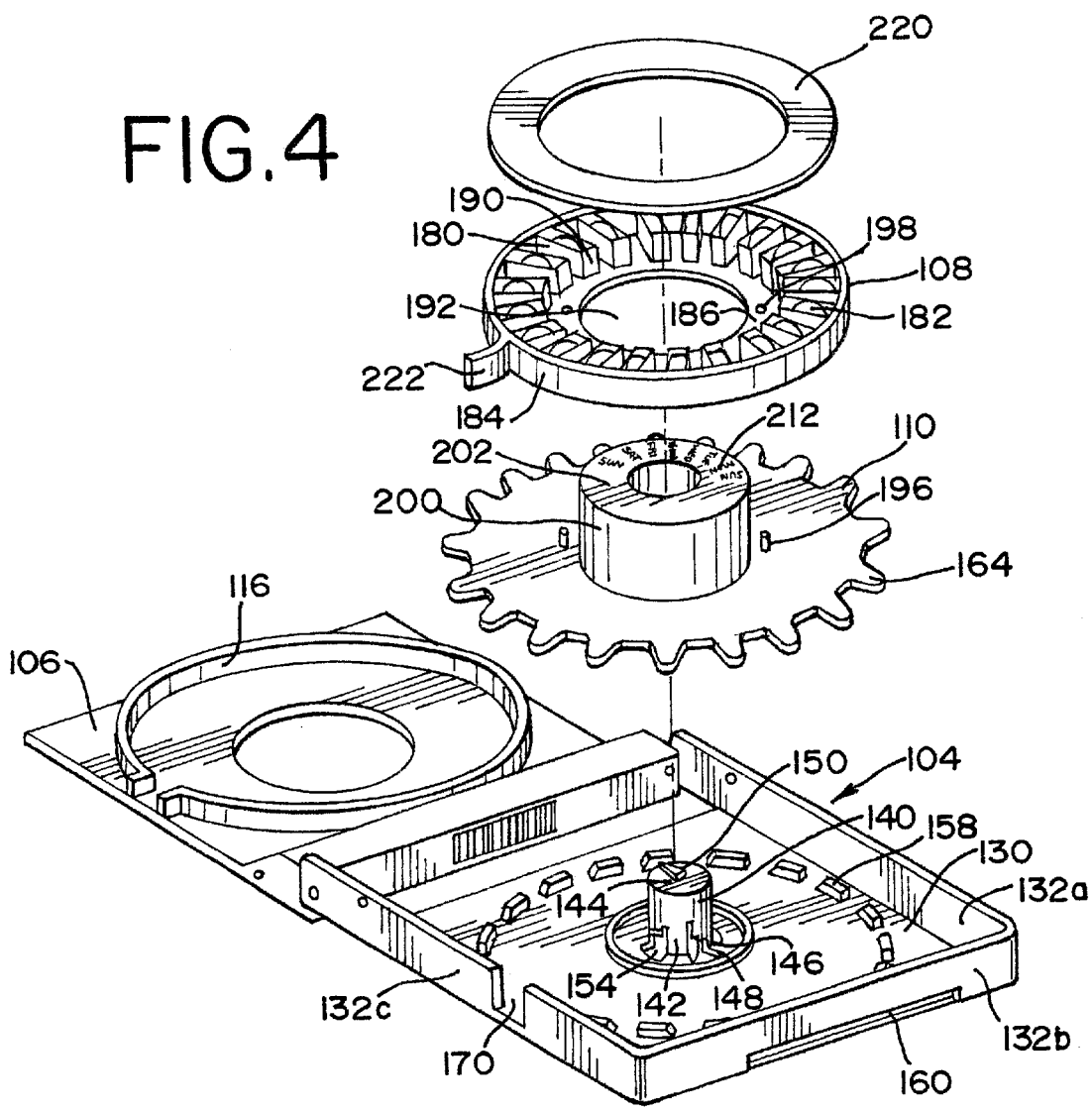
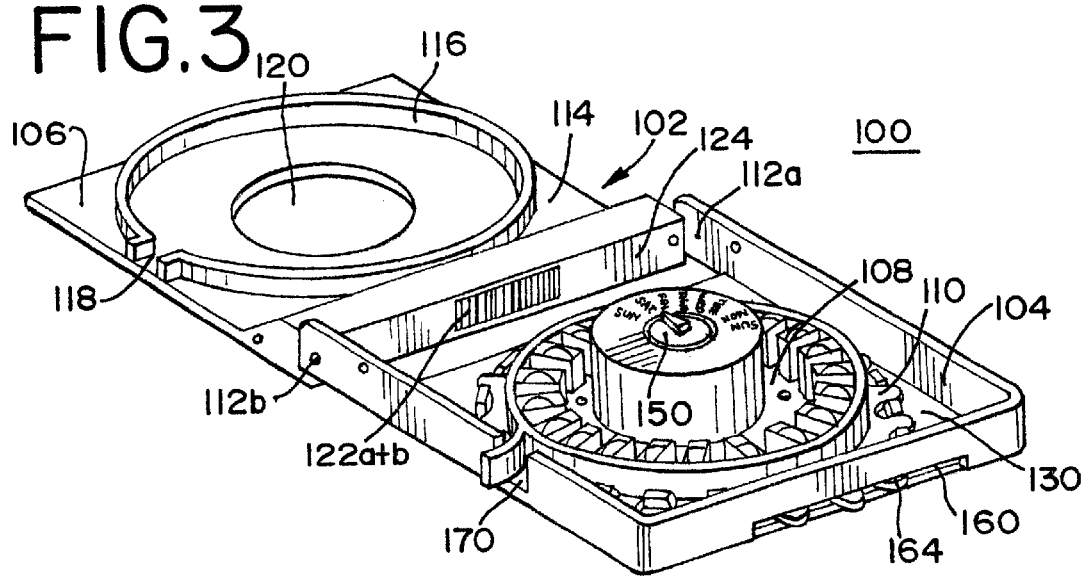

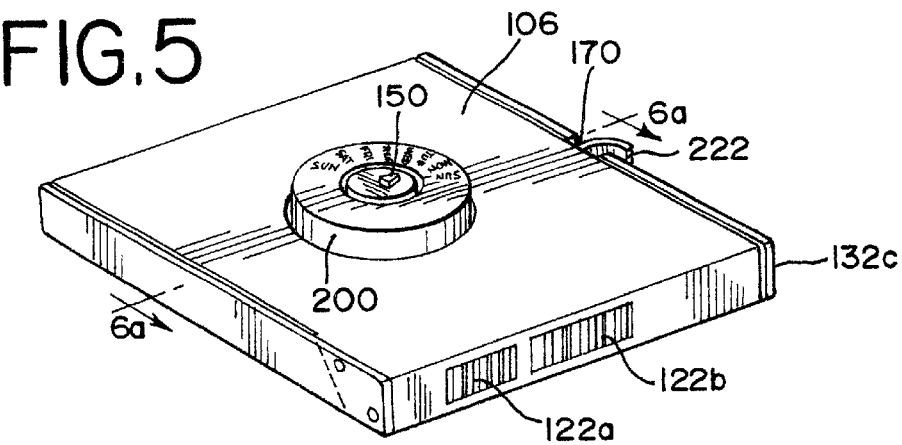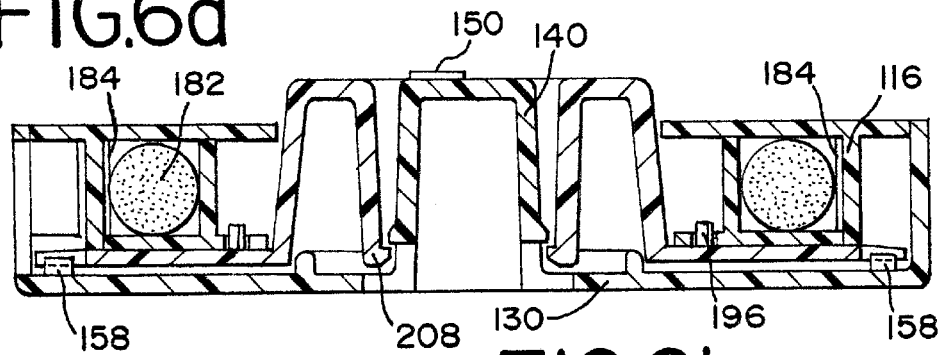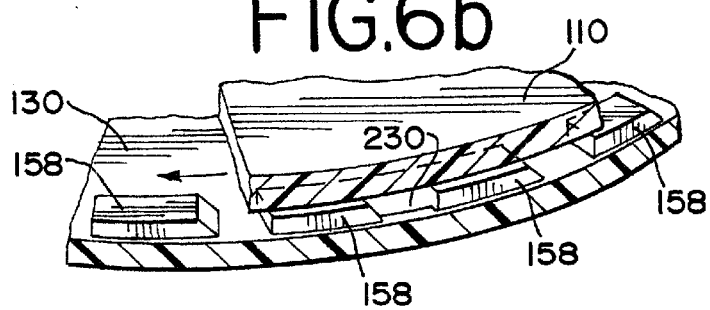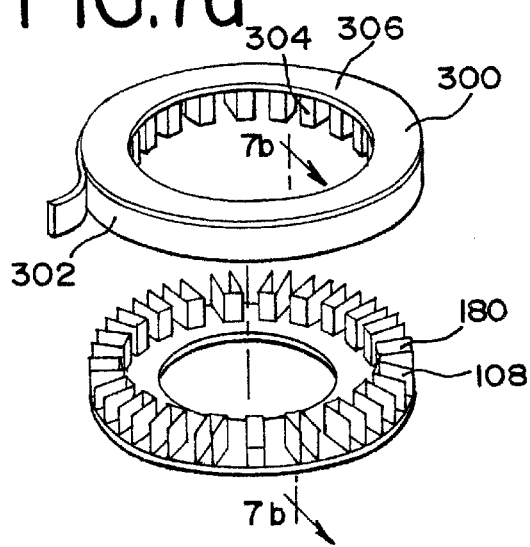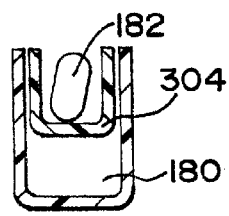

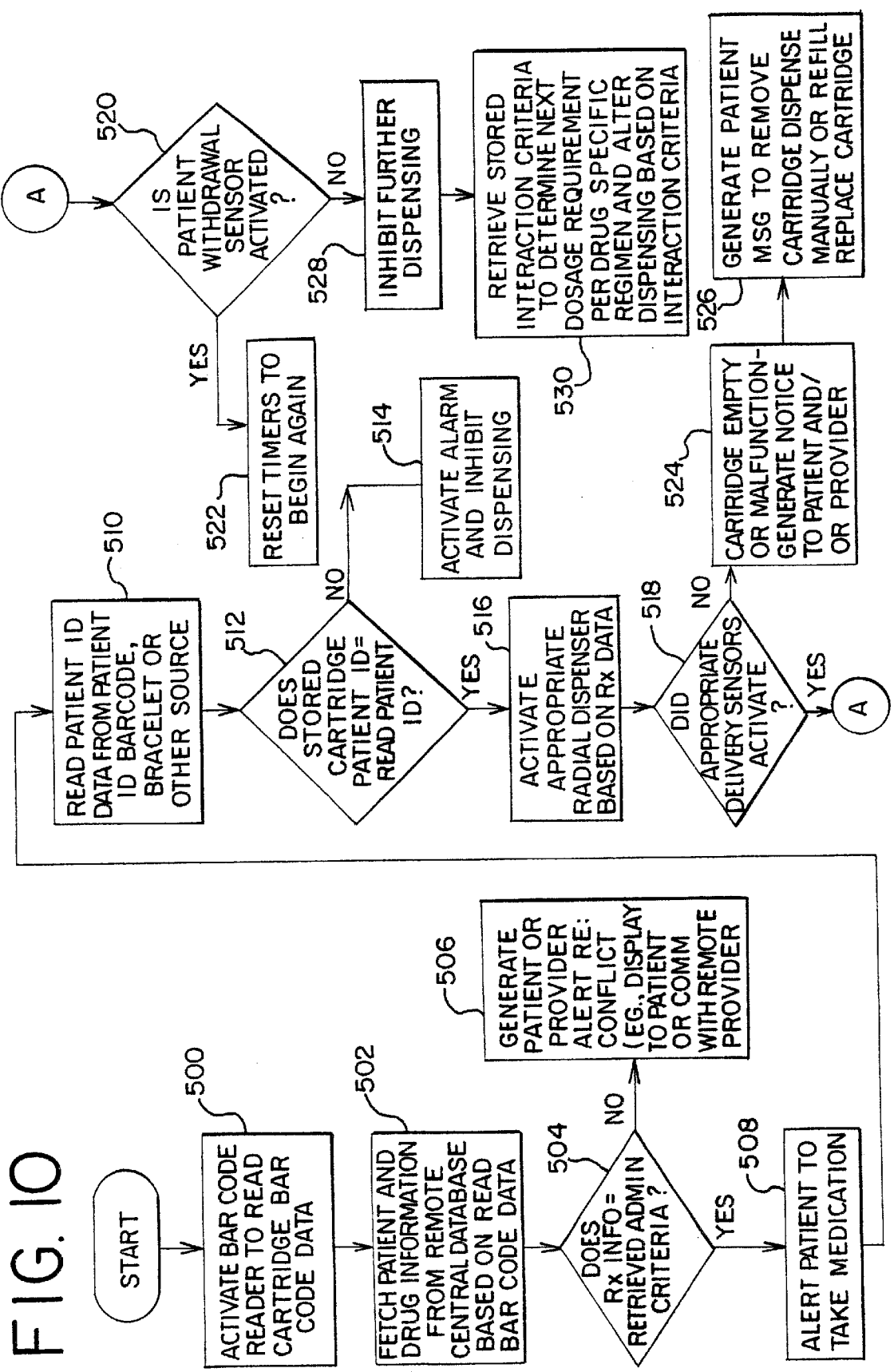

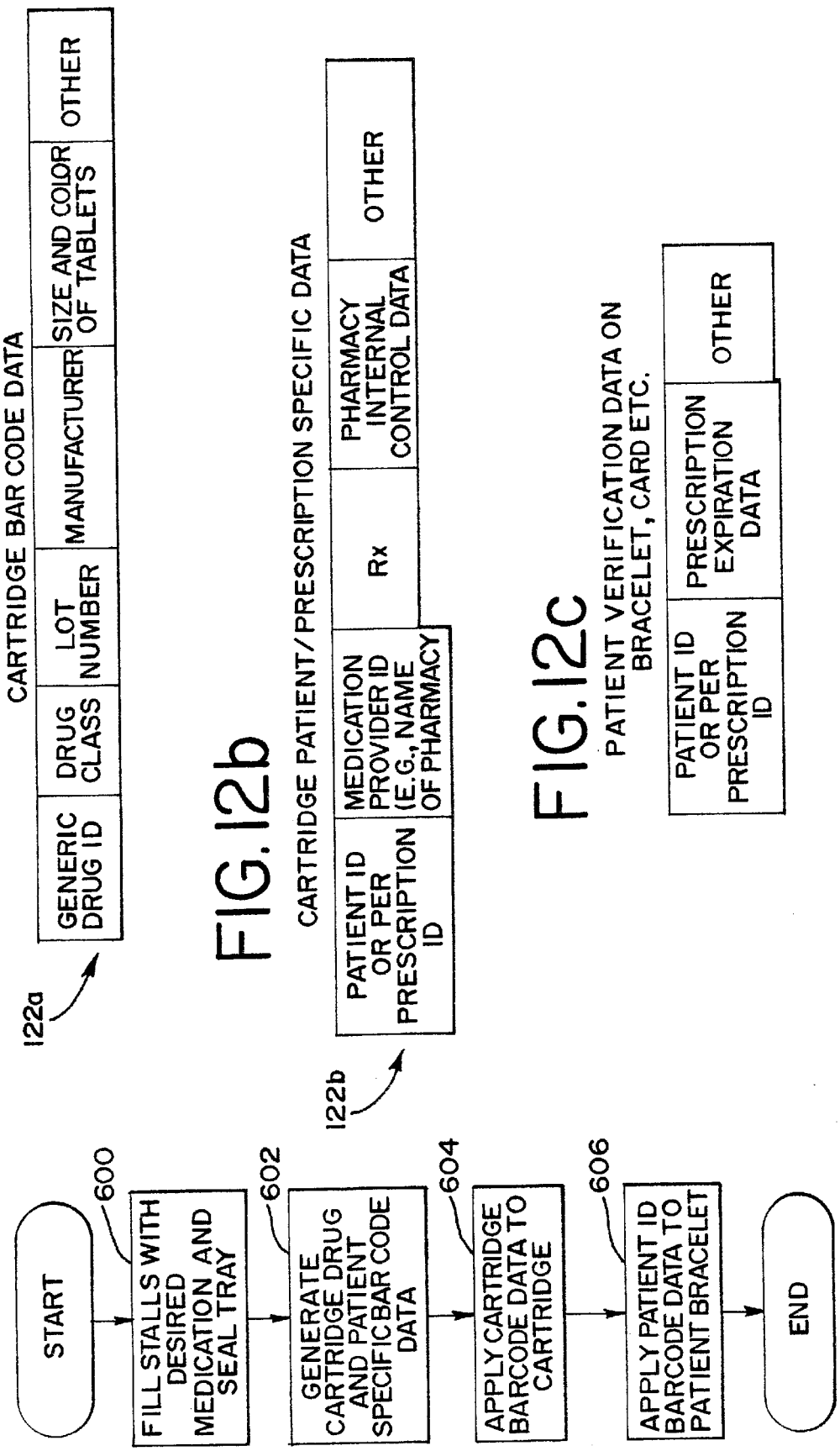

AUTOMATED PORTABLE MEDICATION RADIAL DISPENSING APPARATUS AND METHOD

RELATED CO-PENDING APPLICATION

This application is a divisional of related co-pending application entitled "Automated Portable Medication Radial Dispensing Apparatus And Method", filed on Mar. 26, 1999, having Ser. No. 09/280,109, now U.S. Pat. No. 6,234,343 and inventor Mary Anne Papp.

FIELD OF THE INVENTION

The invention relates generally to systems and methods for facilitating patient prescription compliance and for dispensing medication and more particularly to portable medical dispensing apparatus and methods with patient compliance control.

BACKGROUND OF THE INVENTION

Patient non-adherence to prescribed medication regimens is high, with non-adherence rates among geriatric patients ranging 40–75% according to several studies. Multiple factors contribute to non-adherence including visual, auditory, and cognitive impairments, as well as poly-pharmacy, poly-providers, and visit and refill compliance. Drugs not taken, or taken incorrectly, incur the same healthcare costs as fully adherent regimens, but without the expected medical outcome. One recent study reported that non-adherence to medication regimens accounted for 18% of hospitalizations in the elderly. In addition to the needs of the elderly, the identification and documentation requirements for medication administration in schools, workplaces and assisted living facilities have increased. As such, many attempts have been made to provide prescription reminder systems and methods as well as medication delivery systems for patients who may benefit from monitored medication dispensing. For example, systems are known which provide patients with alert devices to remind patients of when to take medication, and how much medication to take. In addition, there are various systems that protect patients from over-dosage and underdosage and attempt to improve patient compliance using such devices as unit dose containers, timing mechanisms, and sensors to detect patient use. These interventions may require labor-intensive filling and monitoring as well as on-site reprogramming to allow for interval changes in medical regimen. Positive identification of the medication in the dispensing unit from pharmacy to point of use would be more desirable.

A preferred system would also include patient identification information that may be read by a medication dispensing unit or provider. The medication-dispensing unit may then dispense the appropriate allowance of medication to the matched recipient at an appropriate time under microprocessor control. Such dispensing units could be remote from a main unit of a health care provider, such as a physician, hospital or other health care provider. The health care provider may communicate with the patient through the dispensing unit to provide prescription information, drug interaction information, dosing change and other feedback as desired. The software programs to provide such control exist in the public domain, and have been used by institutions to monitor safety and compliance. However, the dispensing units employed are geared to high volume institutional use.

Prior home dispensing systems typically are not readily portable, and do not provide a relative cost effective and easy mechanism to dispense medication. Filling and refilling may require in-home assistance. Transfer of medication from a pharmacy or provider-labeled containers may be required, introducing the possibility of medication identification errors. Also, conventional systems do not match the identities of the prescriptions to the patient. For example, they do not typically verify that the patient receiving the medication is the suitable recipient of the prescribed medication. Consequently, there exists a need for an improved portable medication dispensing apparatus and method.

BRIEF DESCRIPTION OF THE DRAWINGS

FIG. 3 is a perspective view of one example of a radial dispensing medication cartridge in accordance with one embodiment of the invention.

FIG. 4 is an assembly view of one example of a radial dispensing medication cartridge in accordance with one embodiment of the invention.

FIG. 5 is a perspective view of the radial dispensing medication cartridge of FIG. 3 with the cover closed.

FIG. 6a is a cross-sectional view of the radial dispensing medication cartridge of FIG. 5.

FIG. 6b is a cutaway partial cross-sectional view showing interacting teeth for the cartridge in accordance with one embodiment of the invention.

FIG. 7a is an illustration of an example of a tablet stall insert and an associated tablet tray in accordance with one embodiment of the invention.

FIG. 7b is a cross-sectional view of the tablet stall insert, inserted into the tablet tray shown in FIG. 7a.

FIG. 10 is a flow chart illustrating one embodiment of the operation of the medication dispensing apparatus illustrated in FIGS. 2 and 8 in accordance with one embodiment of the invention.

FIG. 11 is a flow chart illustrating the operations that may take place, for example, with a provider to fill and suitably provide a tablet tray in accordance with one embodiment of the invention.

FIGS. 12a and 12b are graphic representations of examples of cartridge bar code data and cartridge patient/prescription-specific data that may be placed on a cartridge in accordance with one embodiment of the invention.

FIG. 12c is a graphic representation of an example of patient data that may be used to verify that the correct patient is receiving the medication.

DETAILED DESCRIPTION OF A PREFERRED EMBODIMENT OF THE INVENTION

Figure 1:
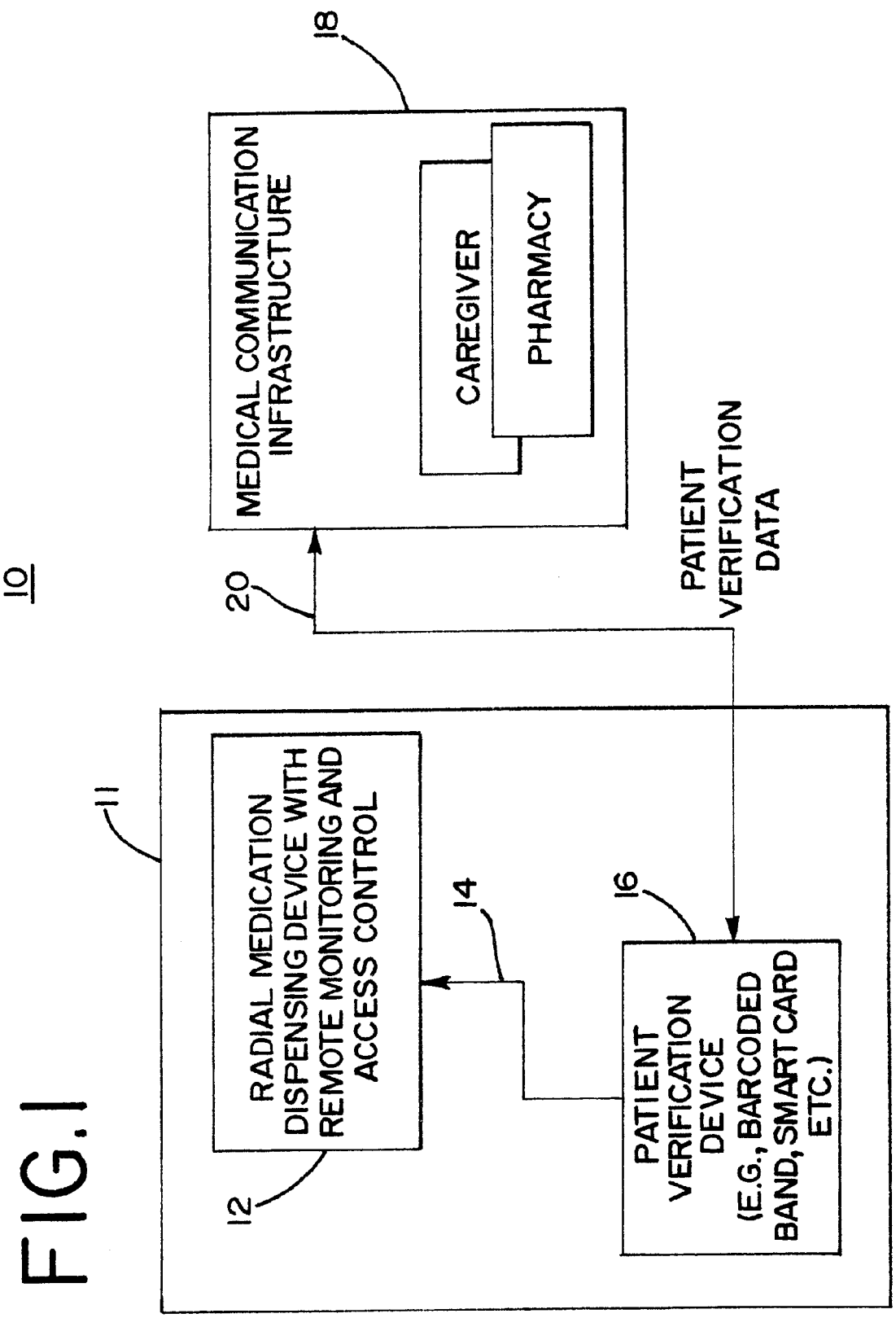
FIG. 1 is a block diagram illustrating one example a radial medication dispensing device with remote monitoring and access control in accordance with one embodiment of the invention.

Briefly, a portable medication cartridge allows for both manual and automated dispensing of tablets or capsules of virtually all sizes through a radial dispensing apparatus. The cartridge may be sealed and encoded with medication and patient identification. A microprocessor controlled medication dispensing apparatus includes a cartridge magazine capable of holding a plurality of cartridges for the same or different patients. The portable medication dispensing apparatus and method detects patient identification data and activates a radial dispensing medication cartridge in response to verification of patient identification data. The medication is sequentially advanced and allowed to radially dispense through an open side of the tablet tray from the medication cartridge.

In one embodiment, the medication dispensing apparatus includes a radial dispensing medication cartridge magazine that holds a plurality of medication cartridges to accommodate differing medications or patients. The medication dispensing apparatus includes a suitable processing device and remote interface to allow a provider to directly communicate with the apparatus and allow the patient to provide information or respond to questions through a keypad speaker or other suitable interface. In addition, the processor controls dispensing of medication from the radial dispensing medication cartridge at an appropriate time and in appropriate amounts based on either preprogrammed timing information, information communicated remotely to the device, or from a patient identification device such as a bar coded wrist band, encoded card or other suitable patient identification mechanism. The device may also communicate with patient wearable alert mechanisms such as wrist watches or pagers.

In one embodiment, the radial dispensing medication cartridge magazine is downwardly sloped along with an associated angled tablet chute so that the radially dispensed tablets travel down the chute and subsequently to a common tray where the tablets may be extracted for consumption. The angled magazine also reduces the distance that a tablet falls before travelling down the tablet chute. The tray may be removable with a plurality of electronically identified compartments to hold a day's medication. A processor actuates one or more radial dispensing medication cartridges. If desired, dispensing may be controlled remotely by a caregiver through a remote communication interface. The remote communication interface may include, for example, a bar code reader that may read both a bar code on a patient bracelet and also read bar code medication information on each cartridge so that the system can determine the type of medication within each cartridge and confirm the identity of the patient. The medication barcode data on the cartridge also preferably includes dosage and frequency data that is read by the processor and provides medication specific administration criteria to be communicated to the device to accommodate variances in administration schedules.

In one embodiment, the radial dispensing medication cartridge includes a manual activation surface, such as a knob or other surface, to facilitate manual radial dispensing of medication from the cartridge when the cartridge is removed from the magazine. The radial dispensing medication cartridge may also include a separate surface adapted to engage with an actuator during automated radial dispensing of medication in the cartridge when the cartridge is in the magazine.

Compliance is monitored through sensors located in the magazine at each cartridge location and in the patient extraction tray. The device's medication administration criteria are reset when the sensors are activated at both locations. Alternatively, or in addition, cameras can be used to verify medication consumption.

FIG. 1 is a block diagram showing a medication dispensing and compliance system 10 having a radial medical dispensing device 12 that receives patient verification information 14 from a patient verification device 16. A medical communication infrastructure 18 may communicate over a suitable communication link 20 with the radial medication dispensing device 12.

The radial medication dispensing device may have, for example, remote monitoring capabilities to allow healthcare providers or computers 18 to monitor information on patient medication compliance or noncompliance as well as control medication access. This allows, for example, a remote caregiver to adjust or cancel a medication regimen.

The medical communication infrastructure 18 may be simply a nursing station, or a more complex medical infrastructure that may include integrated order entry, results retrieval and pharmacy management components. For example, the medical communication infrastructure 18 may be the Veterans Administration Health Information System and Technology Architecture (VISTA). The architecture and features of such a system may be obtained for example from Hines Hospital Veterans Administration, FOIA Office, Hines, Ill. As such, a pharmacist at a pharmacy, a doctor, computer or other personnel may communicate with the patient through a speaker, display or other suitable mechanism to either provide additional information, receive feedback information from the patient, from the radial medication dispensing device or provide instructions, dosage or any other suitable information from a remote location.

The patient verification device may be any suitable mechanism (or mechanisms) that provides some patient verification information 14, such as a patient's name, social security number, or a prescription number, in a manner to match data on a bar-coded on the medication cartridges. The radial medication dispensing device 12 then confirms that the person accessing the machine is the patient. For example, the patient verification device may include a bracelet with a bar code, a watch with an infrared communication link, a smartcard, or any other suitable mechanism that can provide requisite patient identification information.

Figure 2:
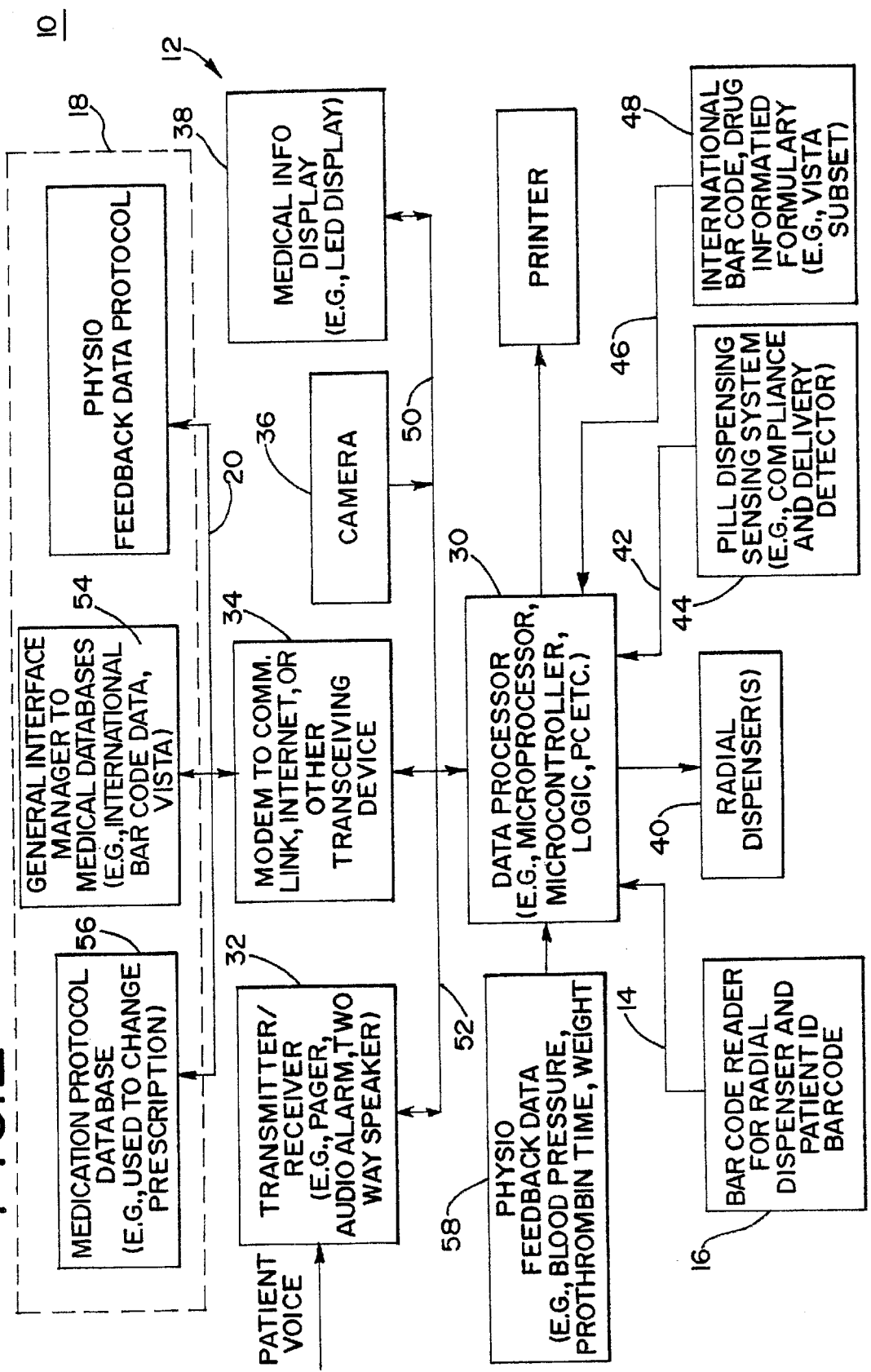
FIG. 2 is a block diagram illustrating one example of a radial medication dispensing device with remote monitoring and access control in accordance with one embodiment of the invention.

FIG. 2 shows an embodiment of the medication dispensing and compliance system 10 that employs a radial medication dispensing device 12 having a data processor 30 operatively coupled to an information transmitter and/or receiver 32, a modem 34 or other communication interface device, a camera 36 and a medical information display 38, such as an LCD display or other suitable display device. The processor 30 is also operatively coupled to the patient verification device 16 which may be, for example, a bar code reader for a radial dispenser and/or a bar code reader for a patient identification bar code. The data processor 30 is also operatively coupled to control one or more radial dispenser actuators 40 that may be part of the radial dispenser. The data processor 30 also receives pill dispensing detection data 42, such as whether tablets have been suitably dispensed, from a cartridge tablet sensing system 34 and verify that they have been removed through sensors in the receiving tray. The data processor 30 may also receive control or medication information 46 from an international or other standardized medication database such as the International Pharmaceutical Bar Code Association database and the National Patient Medication Information software or local pharmacy software which provides drug interaction information as well as patient information to the data processor. The medication information source 48 may also be suitably coupled to the modem 34 or to any other suitable connection to provide the data processor 30 with the requisite medical information required by the radial medication dispensing system.

The data processor 30 may be any suitable microprocessor, microcontroller, logic, state machine or other suitable circuit that may employ software control or hardware control or a suitable combination thereof to facilitate the dispensing of medication from the radial dispensing device. The transmitter and/or receiver 32 may be a pager, audio alarm, speaker or any other suitable device that may receive a patient's voice or transmit a caregiver's voice or other information to facilitate compliance, monitoring, emergency information or any other suitable information as required. The modem 34 provides an interface between the medical communication infrastructure 18 and the data processor 30 so that suitable information can also be communicated. Communication may occur over any suitable communication link 20 which may be, for example, a network link, a wireless communication link, telephone line or landline communication or other suitable link.

The camera 36 may be any suitable camera that may be located, for example, in the patient's home or office through which video information 50 is passed from the camera through the modem or to the data processor 30 as feedback information so that a caregiver can monitor exactly how the radial dispensing apparatus is being used, or can visually view the medication being removed from the tray or any other suitable monitoring, if desired. The medical information display 38 displays, for example, medical information relating to the medication in the radial dispensing apparatus. For example, the medical information that may be displayed by the data processor may include information relating to the dosage, conditions for administration (fasting, with water, etc.), information sent by a medical communication infrastructure 18 indicating drug interaction information or any other suitable information including, for example, refill alerts and instructions, or visit reminders. The data processor 30 communicates with the transmitter/receiver 32, the modem 34, the camera 36 and the medical information display 38 through a combination of suitable busses or links generally indicated at 52.

The medical communication infrastructure 18 may include, for example, a General Interface Manager 54 to access multiple programs at a number of sites or a dedicated medication protocol computer 56, such as a Warfarin Adjustment protocol medical computer as known in the art that is used to change prescriptions so that the dosages or medication dispensed by the radial dispenser are changed on a per cartridge basis and per patient basis, if desired. The databases may include, for example, international pharmaceutical bar codes, drug identification and interaction allergy tracking, drug administration criteria (dosage, etc.) and patient medical information indexed by patient ID. The physiofeedback data 58 are, for example, blood pressure, weight, glucose levels, protimes from the patient, that also may be coupled and communicated through the data processor 30 or any other suitable information that may be used by a caregiver to determine whether a patient's reaction to the medication is within acceptable parameters. As such, a blood pressure monitor, scale or other suitable physiodata provider is operatively coupled to the processor 30. Keypad entry may also be used to enter queries or data.

FIG. 3 illustrates one example of a radial dispensing cartridge 100 that includes a housing 102 having a base 104, a cover 106, a tablet tray 108 and a rotational member 110. In this embodiment, the housing 102 is configured as a box-like housing with a hinge arrangement for coupling the base 104 with the cover 106. For example, the cover 106 is hingedly attached to the base 104 through protrusions in corresponding detents indicated generally at 112*a* and 112*b*. However, it will be recognized that any suitable coupling of the base to the cover may be used. Also, the hinge may also be coupled to another side of the base.

The housing 102 may be made from plastic or any other suitable materials. The cover 106 has an inner surface 114 from which a tablet retaining wall 116 protrudes. Tablet retaining wall 116 projects generally upwardly from an inside surface of the cover 106 when the cover is open as shown. The tablet retaining wall 116 may be a circular retaining wall or any other suitable shape that retains tablets within a tablet tray 108 when the cover 106 is closed. The tablet retaining wall 116 includes an opening 118 through which tablets are radially dispensed. In this embodiment, the tablet retaining wall is integrally molded as part of the cover 106. The cover 106 also includes, if desired, an aperture 120 through which a manual activation surface may protrude to allow manual tablet dispensing.

The cover 106 may also include patient identification data 122*b* such as a bar code label or other mechanism that contains, for example, the name of the patient, the type of medication in the cartridge, the prescription, or any other suitable information. In this example, the bar code label includes identifying data from the International Pharmaceutical Bar Code Association database. Also, in this embodiment, the patient identification data 122*b* or other suitable data is placed on an outer surface of the housing 102. The patient identification data 122*b*, shown in the form of a bar code label, is placed on an end 124 of the housing 102 wherein the end is part of the cover 106 (in this example on the hinge mechanism). However, it will be recognized that the patient identification data 122*b* in its various forms may be placed at any suitable location on the medication cartridge which allows a data reader to obtain the information for use in properly identifying a medication user and for dispensing medication as described below.

Referring to FIGS. 3 and 4, the base 104 of the medication dispensing cartridge 100 includes a support surface 130, a top sidewall 132*a*, sidewall 132*b* and bottom sidewall 132*c*. The support surface 130 is a substantially flat member which serves to carry and support the tablet tray 108 and rotating member 110.

Located substantially centrally on flat support surface 130 is a raised hub 140. Hub 140 has a generally cylindrical configuration and in this instance may have eight spoke-like elements forming a ring about its circumference. Four of these spokes are support spokes 142 which extend generally vertically from flat support surface 130 to the raised upper portion 144 of hub 140 so that the hub is essentially upstanding on four legs. Projecting generally downwardly from upper portion 144 and spaced alternately between support spokes 142 are four resilient, spring-like spokes 146 which do not extend completely down to the flat inner surface 132. A small spherically shaped protuberance 148 is located in a lower end of resilient spokes 146 and cooperates with resilient spokes 146 to provide an attachment for rotating member 110 to the support surface 130.

An optional pointer 150 is located on the flat upper portion 144 of the hub, the pointer being molded integrally with the hub for economies of manufacture. In this instance, the pointer 150 points along the latitudinal axis of surface 130 but may be designed to point in other directions when desirable. In addition, other mechanisms to designate to the user which tablet is to be taken may be employed. The pointer 150 may be used, for example, when the medication dispensing cartridge 100 is used as a manual dispensing device. Support 130 also includes an annular ridge 154 spaced a short distance from hub 140 and surrounding the hub. The ridge 154 is a small protuberance or projecting ring integrally formed in a flat portion of the support 130 and serves to locate and position the rotating member 110 when attached to the base 104.

A first set of ratchet teeth 158 upstands from the support surface 130. The set includes an array of teeth, there being the same number of teeth 158 to correspond with the number of tablets included in the tablet tray 108. Accordingly, the number of ratchet teeth may vary according to the design and purpose of the tablet tray. As currently structured, the radial dispensing cartridge individually radially dispenses one tablet at a time. For individual dispensing purposes, the number of ratchet teeth 158 will thus correspond with the number of tablets. Each tooth 158 is essentially an elongated raised protuberance on the surface of the support 130, and includes an inclined edge which forms an angle with respect to the flat portion of the support. As illustrated, the teeth 18 are intermittently spaced in a circularly oriented array. The ratchet mechanism and hub may be of a similar design described in U.S. Pat. No. 4,165,709 entitled "Tablet Dispenser" issued to John A. Studer, Aug. 28, 1979.

The base 104 also includes a slot 160 wherein at least a portion of the rotating member 110 extends through the slot 160 to expose engageable surfaces to an actuating member. The engageable surfaces in this embodiment, are shown as surfaces 164 which may be shaped as gear teeth. A slot 160 is configured in sidewall 1 32b to receive a portion of the rotating member, namely the engageable surfaces. Top sidewall 1 32b is opposite to the hinge. The bottom sidewall 132c includes a single tablet dispensing aperture 170. The tablet dispensing aperture 170 is substantially rectangularly shaped and extends completely through the bottom sidewall 132c. In this embodiment, the tablet dispensing aperture 170 is also located with respect to the pointer 150 so that the pointer directly points to the aperture 170.

The tablet tray 108 and rotating member 110 make up a rotational tablet dispenser adapted for rotational advancement of medication and radial dispensing of medication from the cartridge. The tablet tray 108 includes a plurality of tablet stalls 180 that have at least a partially open top and a side. The tablet stalls 180 house tablets 182. The number of tablet stalls 180 corresponds in this embodiment to the number of teeth 158. The tablet tray 108 is a ring-shaped tablet tray having a removable tablet retention band 184 which temporarily closes the open sides of the stalls. The removable tablet retention band 184 may be operatively coupled to a base 186 of the tablet tray by perforation or other suitable removable attachment mechanism. During filling or refilling of the tablet stalls, the removable tablet retention band prevents tablets from exiting the open side of the stall. Each of the tablet stalls 180 has a back wall 190 to prevent the tablets from falling out of the stalls. The tablet tray 108 includes a substantially centrally located hole 192 extending therethrough. The hole 192 is sized to fit over hub 150. The front side of the stalls that are open and temporarily closed by the removable tablet retention band are located about the circumference of the tablet tray 108. Each open front side is spaced along a radius from a center point of the tray. The open side opening is arranged to individually align in registration with bottom wall aperture 170 when the tray is attached to a surface of the rotating member 110 and rotating member 110 is then placed in cooperation with the base 104.

The rotating member 110 includes a plurality of protrusions 196 that in this embodiment are spaced at approximately 120° apart may be integrally molded from plastic if desired. The protrusions 196 extend through corresponding openings 198 in the tablet tray 108 to affix the tablet tray to the rotating member. The rotating member 110, in addition to including the engageable surfaces 164 to engage with an actuating member for automated radial dispensing tablets, also includes a manual activation surface 200 to facilitate manual radial dispensing of medication from the cartridge. In this embodiment, the manual activation surface 200 is a knob or other surface, such as an upraised annular surface, which is sized to receive the tablet tray 108 through hole 192. The annular portion has a substantially flat upper face 202 which is upraised to lie at a height above the cover 106 when the cover is closed (see, for example, FIG. 4). Similarly, the hub 150 is also protruding to extend above an outer surface of the cover when the cover 106 is closed. The upraised annular portion has a substantially U-shaped cross section, thereby forming a hollow portion between the upstanding legs which extend vertically downward to support flat surface 202. Immediately surrounding the hole 102 is an annular phalange 208 (FIG. 6) which serves as a short, circular lip to provide a mechanism of connection between the support 130 and the rotating member 110. Located on flat supper surface 202 is a plurality of indicators of periodicity 212. The indicators may be applied onto the member using stickers to allow for different schedules. As one example, the indicators may be abbreviations of the days of the week and each indicator day is referenced to a tablet in the tablet tray. Being affixed to the upper face of the annular portion of the rotating member, indicators 212 thereby rotate with the rotating member when rotation occurs. It will be understood that a variety of other information may be chosen, depending upon the type of tablets to be dispensed, and the rate to be taken.

The rotational member 110 as configured in this embodiment is a gear having the plurality of actuation surfaces 164 configured to engage an actuation device to rotationally advance medication in the cartridge. The actuation surfaces in this embodiment are teeth. When assembled, the base 104, which includes the plurality of ratchet protrusions or teeth 158, are operatively engageable with the rotating member 110 to restrict rotational movement to facilitate single dose radial dispensing of tablets wherein the radial dispensing is out the bottom side wall through aperture 170.

The tablet tray 108 may be suitably made from a variety of materials including plastic and other conventional material used to package tablets. For example, suitable material that may be used to make the ring tablet trays may be the materials used by Ortho Pharmaceutical Corporation, Raretan, N.J. to make tablet trays disclosed in U.S. Pat. No. 4,165,709. This may be, for example, blister pack or blister sheet. The blister pack is made of a thin plastic or other easily formable material which has been formed into a plurality of tablet stalls. The tablet stalls are arranged in a circular orientation and substantially equally spaced apart to correspond with the teeth 158. Each stall is shaped and sized so as to enable commonly sized and shaped tablets or other solid form of pharmaceutical preparations to fit therein. It has been found that one suitable stall dimension may be height =9/16", width =0.375" and depth =7/8". The base 180 and removable tablet retention band 184 may be made of a frangible membrane such as a thin sheet of material such as foil or the like.

The tablet tray 108 is operatively removable from the cartridge housing so that refills or other tablet trays can suitably be installed. The filling of the tablet trays 108 may be done, for example, by a pharmacy, tablet manufacturer or other tablet source either by a manual or an automated system. The open top of the stalls allows placement of the pills within the tablet tray 108. In one embodiment, each cartridge contains a single drug for a single patient. Once the tablet tray 108 is filled with the appropriate tablets, a stall top cover member 220 is placed over the top of the stalls to keep the tablets in their respective stalls during transportation. The stall top cover member 220 may be a flat ring shaped cap to correspond to the ring shape of the tablet tray and may be a non-adhesive cap or an adhesive-based cap, if desired. (For purposes of illustration, the stall top cover is not shown in FIG. 3). The stall top cover member may also be a flat sheet or any other suitable cover member adapted to cover the stalls.

As shown, the tablet stalls 180 are positioned along the periphery of the trays and are sized to hold a single tablet. The tablet tray 108 with stall top cover member 220 is aligned into position with the rotating member 110 through the apertures 198. The cover 106 is then closed whereafter the removable tablet retention band 170 is removed to facilitate removal, the removable table retention band 170 includes an extension portion 222. The extension portion 222 is placed through the aperture 170 so that it may be readily gripped by fingers or other device. The removable tablet retention 170 band is removably fixed to a surface (e.g., base) of the tablet tray 108 such that it may be removed while the cover is closed. The removable retention band 170 should be sized and temporarily attached such that pulling the removable retention band 170 causes the rotating member to rotate and disconnection of the band 170 from the tray. Removing the tablet retention band 170 then exposes the open sides of the stalls. To avoid undesired tablet waste during band 170 removal, one stall may be kept empty. The permanent tablet retention ring 116 in the cover surrounds the removable retention band 170, so that during and after removal the retention ring 116 serves to effectively close the ends except for the stall which is placed in position with the aperture 170 to dispense a tablet. As such, the tablet tray 108 may be suitably transported and filled in a advantageous manner. The tablet tray 108 is a unitary structure in itself which provides easy handleability for placement of the tray into the dispenser and subsequently easy removal upon exhaustion of the tablet supply.

On an undersurface of rotating member 110, the surface facing flat support surface 130, there is a second set of ratchet teeth 230 FIG. 6b. In this instance there are only three ratchet teeth in the set and they are spaced substantially equal a part and circularly located on a radius which is substantially the same as the radius of location of the first set of ratchet teeth 158 on the support surface 130. Ratchet teeth 230 include an inclined edge thereon and project from the rotating member 110 to oppose the first set of ratchet teeth in the support. Thus, the two sets of ratchet teeth 230 and 158 are adapted to become intermittently engaged with each other to thereby allow incremental rotation of the tray and the support in only one rotative direction, not the other. This rotation is accomplished by the orientation of the incline surfaces in the vertical wall in each tooth directly opposite the incline surface. Such a mechanism is further disclosed, for example, in U.S. Pat. No. 4,165,709 incorporated herein by reference.

Referring to FIG. 5, the cover of the magazine is closed to enclose the tablet tray within the base. The manual activation surface is exposed above the top of the cover to allow manual activation of radial tablet dispensing out aperture 170. As shown, the aperture 170 is the only aperture through which medication may be dispensed.

Referring to FIGS. 7a and 7b, a matable stall insert 300 is shown having tablet stalls of a size smaller than the tablet stalls of the tablet tray 108. The matable stall insert 130 may contain, for example, smaller tablets. The matable stall insert 300 is operative to mate with the tablet stalls 180 so that the common size base tablet tray 108, can be fabricated along with differing sized stall inserts 300 to accommodate different size pills, such as smaller pills. As seen in FIG. 7b, also, the matable stall insert 300 includes a removable tablet retention band 302 projecting downward along a periphery of the insert to temporarily close open sides of the tablet stalls 304. As indicated, tablet stalls 304 have a base wall and rear wall and corresponding side walls but the top of the stall and the front side of the stall are open prior to the removable retention band being applied and prior to a stall top cover 306 being applied. The removable tablet retention band may be removably attached to a surface of the insert 300 through perforations.

Figure 8:
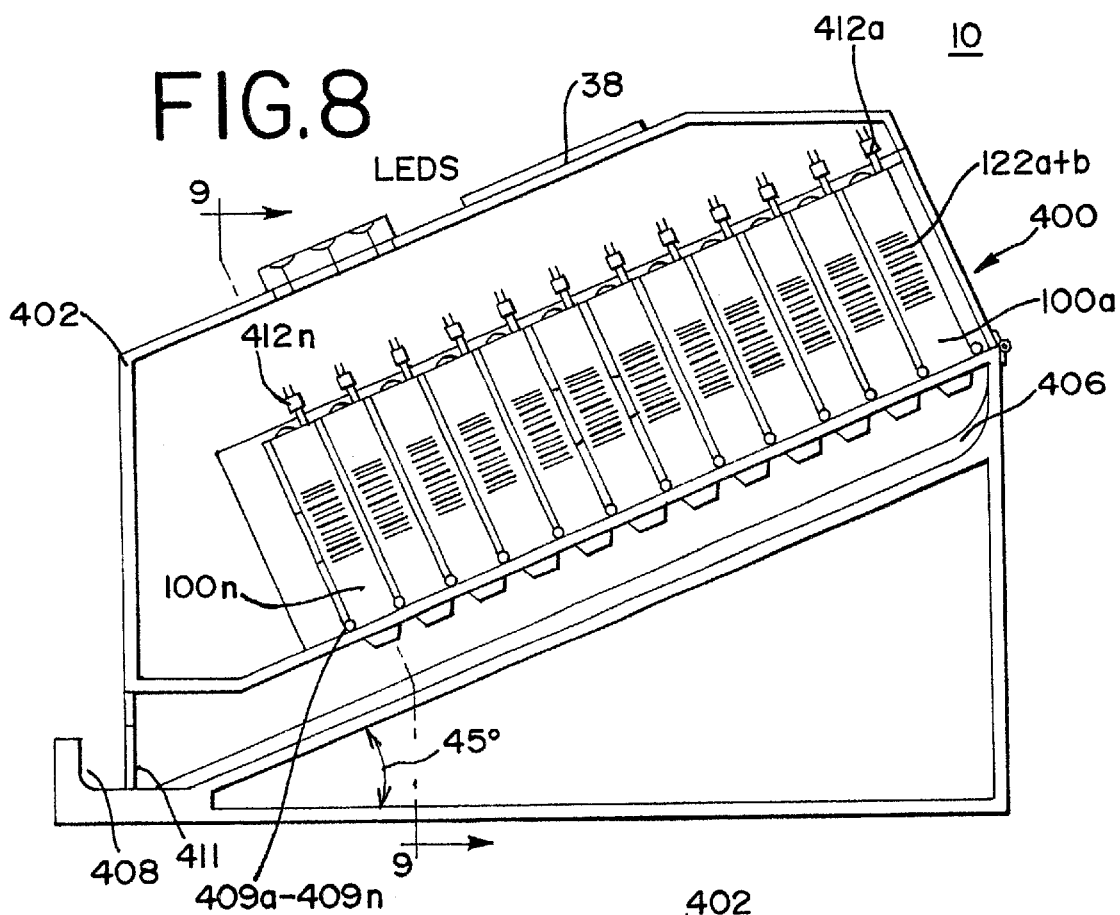
FIG. 8 is a perspective view of a medication dispensing apparatus in accordance with one embodiment of the invention having a sloped medication cartridge magazine and an angled tablet chute in accordance with one embodiment of the invention.

Referring to FIG. 8, a medication dispensing apparatus 10 is shown having a medication cartridge magazine 400 adapted to hold a plurality of radial dispensing medication cartridges 100a–100n. The device includes an enclosure 402 that houses the cartridge magazine 400 along with the requisite components of FIG. 2. As shown, the cartridge magazine 400 holds the plurality of the radial dispensing medication cartridges 100a–100n on edge and adjacent to one another to facilitate compactness and portability. The patient identification data 122 is machine readable medication identification data. Also, referring to FIG. 9, the plurality of radial dispensing medication cartridges 100a–100n radially dispense tablets downwardly through their respective apertures 170 into a common sloped tablet chute 406. Sloped tablet chute 406 has a cross-sectional "V" shape and directs radially dispensed tablets to a common receptacle 408 which contains all of the medication for a particular dosage. The sloped table chute may be sloped at an angle of approximately 45°. However, any suitable slope may also be used. FIG. 8 represents, for example, a cross-sectional side view of apparatus 10 through its housing 402. The sloped cartridge magazine 400 is suitably affixed to a frame within the housing and is adapted to hold the plurality of radial dispensing medication cartridges. The sloped cartridge magazine is sloped at about 45°. The sloped tablet receiving chute 406 is operatively located to receive tablets that are radially dispensed from the plurality of cartridges. Each of the plurality of cartridges 100a–100n as indicated includes an opening 170 therein through which an individual tablet is radially dispensed in response to actuation by an actuating mechanism 410. In this embodiment, the actuating mechanism 410 includes a separate actuator 412 associated with each of the plurality of radial dispensing medication cartridges 100a–100n. As such, the system 10 includes actuators 412a–412n. Each actuator 412 suitably engages the actuation surface of each of the rotational members to rotationally advance medication in the cartridge and regularly dispense the tablet vertically. The actuators 412a–412n may be, for example, electrically activated solenoids and associated activating members 413. Here the actuating members 413 are "L" shaped pivoting members suitably biased to operatively advance the rotational member to radially drop or expel one tablet at a time by being pushed forward by the solenoid and retracting after the rotating member has rotated. However, any suitable activating structure may be used, such as a direct action reciprocating solenoid, a series of linkages or other suitable mechanism. The common receptacle 408 may include a cover (not shown) which may provide a feedback signal to the data processor 30 to indicate whether medication has been removed from the common receptacle 408. If desired, the common receptacle 408 may also be configured as a plurality of separate receiving compartments wherein each compartment is dedicated to receive tablets from each of a separate cartridge 122.

Compliance detection is accomplished through the use of a plurality of sensors. In this embodiment, an array of electrodes or wires shown in cross-section as 409a–409m serve as one type of per cartridge based sensing device. The sensor uses a capacitance based array wherein capacitance is generated by the wires so that when a tablet drops from any of the cartridges, the change in capacitance between lines is detected by the processor 30. Depending upon which capacitance field is varied by the dropping of the tablet, the processor determines which cartridge radially dispensed the tablet. In addition to the per cartridge based sensor, a tray sensor 411, such as another capacitance based sensor, is placed in the receiving tray. Suitable wires are positioned to create another field and may be broken by fingers or other protruding elements that break or vary the capacitive field to obtain the tablets. As such, if the processor determines that a tablet has been dropped in accordance with a regimen, but that the sensor 411 has not detected that the tablet or tablets have been removed, the medical data bases may be reviewed to determine whether the next dosage needs to be modified and may also generate a display to the patient or a beep for the patient indicating that the medication has been dispensed.

Figure 9:
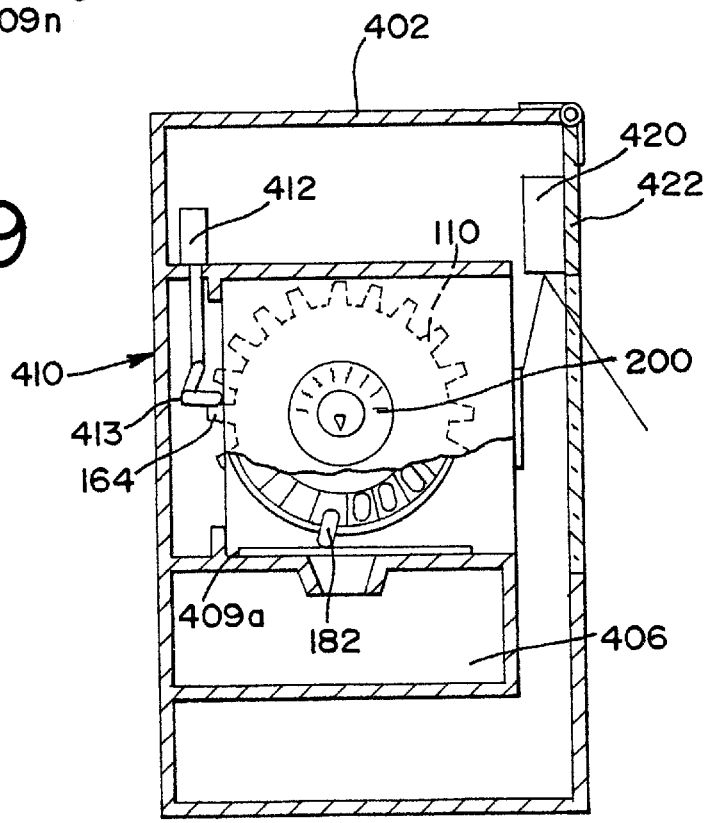
FIG. 9 is a cross-sectional view illustrating an actuator and associated rotating member of a radial dispensing medication cartridge in accordance with one embodiment of the invention.

Referring to FIGS. 2, 8 and 9, medication dispensing apparatus 10 uses a patient verification device, such as processor 30, operative to activate the radial dispensing medication cartridge in response to verification of patient identification data. The medication dispensing apparatus 10, as previously noted, includes the remote communication interface 34 as well as the data processor 30 that is operatively coupled to the radial tablet dispensing actuator 412, the patient verification device, such as the processor 30, and to the remote communication interface.

Each of the plurality of radial dispensing medication cartridges 100a–100n includes medication identification data 122, such as bar code data containing medication identification data and patient identification data. Medication identification data 122 may include, for example, the type of medication in a given cartridge along with its dosage requirements as well as patient identification data indicating the name and other patient identification information to ensure that the medication from the appropriate cartridges are being used for the proper patient. As such, the medication identification data 122 on different cartridges may be for different patients although housed in the same magazine.

The housing 402 includes a bar code reader 420 positioned to read the bar code data 122. The housing also includes a window 422. The bar code reader 420 is positioned to read the bar code data 122 on each cartridge and also to read the bar code data located outside the housing, such as bar code data on a patient's wrist band, for example. The system then reads the bar code information on the patient's wrist band prior to dispensing medication. The system, through the data processor, compares the patient identification data from the patient's wrist band or verification card with the stored bar code information from the cartridges and confirms that the patient and cartridge are designated for each other and the processor suitably activates each appropriate solenoid the dispense the appropriate dosage of medication. As such, the processor receives patient identification data and also obtains patient identification data from the cartridge to serve as the patient verification means. The processor obtains, for example, patient identification data, medication identification data and dosage data from the plurality of radial dispensing medication cartridges when they are first inserted (and prior to each dispensing operation if desired) and subsequently controls the radial tablet dispensing actuator 412 to radially dispense single tablets from one or more cartridges in response to the obtained patient identification data, medication identification data and dosage data. The processor generates a control signal to the radial dispenser actuator (solenoid) either based on the comparison of information from the patient's wrist band and corresponding bar code as well as prestored dosage information that may have been communicated, for example, to the remote communication device, from a caregiver to indicate a change in dosage if the dosage information is not included on the bar code information and on the cartridge.

Referring to FIGS. 10–12, the apparatus will activate the bar code reader to read the cartridge bar code data 122a when a cartridge has been placed in a magazine as detected by the bar code reader or as indicated through a keypad by a patient. As shown in block 502, the system fetches the patient and drug information from the databases 18 based on the read cartridge bar code data. As shown in block 504, the system determines whether the prescription information from the bar code data matches the retrieved administration criteria data for the particular drug. If the prescription information does not match the administration criteria data, the system generates a patient or provider alert regarding the conflict as shown in block 506. For example, the system may display an error message to the patient or initiate communication with the remote provider to the modem. If the prescription information as read from the cartridge bar code matches the administration criteria for the given drug, the system alerts the patient to take medication as shown in block 508. This may be done, for example, by paging the patient, emitting a sound through the speaker, or through other suitable notification mechanisms.

As shown in block 510, the system reads the patient ID data from the patient ID bracelet (e.g., bar code on the bracelet) or other patient ID source unique to the patient. The system then compares the read patient to see whether the stored cartridge patient ID equals the read patient ID as obtained from the patient bar code as shown in block 512. If the patient ID on the cartridge does not match the patient ID obtained from the bar code data on the patient's bracelet, the system activates an alarm and inhibits dispensing as shown in block 514. As shown in block 516, if the stored cartridge bar code patient ID data matches the read patient ID data from the patient's bracelet, the system activates the appropriate radial dispenser based on the prescription data on the cartridge bar code as shown in block 516. As shown in block 518, the system determines whether proper dispensing has occurred by evaluating the data from the capacitive sensors. If the appropriate delivery sensors were activated indicating that a pill or pills were suitably dispensed, the system determines if the patient withdrawal sensor located in the tray has been activated as shown in block 520. If both the appropriate pill delivery sensors and the patient withdrawal sensor have been activated, the system resets regimen timers to begin dispensing again according to the patient's regimen as stored in the processor shown in block 522.

However, as shown in block 524, if the appropriate delivery sensor did not activate, the system may determine if the cartridge is empty by checking a counter that counts the number of times that a particular actuator for the cartridge had been activated since the last cartridge refill to determine whether medication is still present in the cartridge. If the cartridge is determined not to be empty, the system indicates that a malfunction has occurred and will generate an error notice on the display device for the patient and/or the provider. As shown in block 526, the processor may generate a patient message requesting that the patient remove the cartridge and actuate the cartridge manually to dispense a tablet. This manual dispensing may occur by turning the knob to force rotation of the rotating member.

Referring back to block 520, if the medication has been detected as being dispensed from the proper cartridge but the patient withdrawal sensor has not been activated, the system will inhibit further dispensing as shown in block 528. As shown in block 530, the system retrieves the stored interaction criteria from the suitable database to determine the next dosage requirement for the drug-specific regimen and alters the dispensing based on the interaction criteria to facilitate automatic dosage modification.

As shown in FIG. 11, the tablet trays and associated cartridges may be filled and processed as follows. As shown in block 600, a machine or other operator may fill the tablet stalls as shown in block 600 with the desired medication and then apply the stall top seal. As shown in block 602, a bar code generator generates the cartridge bar code data 122a, patient-specific bar code data 122b, and patient ID bar code data. As shown in block 604, a pharmacist or machine may apply the cartridge bar code data and patient specific bar code data to the cartridge. As shown in block 606, the patient identification bar code data is applied to the patient bracelet or other medium to insure that verification between the patient and the corresponding medication can be performed by the processor.

FIG. 12a–12b represents one example of the cartridge bar code data 122a and the cartridge patient/prescription-specific data 122b. As shown, the cartridge bar code data may be a bar code including, for example, generic drug identification data, drug class information, lot number information, manufacture identification information, the size and color of the tablets in the trays, and any other suitable information. Similarly, the cartridge patient/prescription specific data may be placed in the bar code and may contain patient ID data, such as the name, social security number or other identifying information of the patient, or prescription identification data indicating for example, a prescription number instead of patient identification information. In addition, the cartridge patient/prescription specific data may include medication provider information such as the name of the tablet provider, such as a pharmacy or manufacturer, the prescription (e.g., the physician instructions as to dosage, frequency etc . . . ), any suitable pharmacy provider internal control data, and any other suitable data.

FIG. 12c illustrates an example of patient verification data that may be located in barcode form or any suitable form on a patient ID card, bracelet or other suitable mechanism. The data includes patient identification data such as a name, unique number or other suitable identification data. If the system is used to dispense medication for multiple patients, the identification data may be a prescription identification number. Also if desired, the patient data may include expiration data, that is used by the processor to stop dispensing when the expiration date is reached. This expiration data may also be compared to the expiration data included on the cartridge barcodes.

It should be understood that the implementation of other variations and modifications of the invention in its various aspects will be apparent to those of ordinary skill in the art, and that the invention is not limited by the specific embodiments described. For example, many different variations may be made to the cartridge and system. For example, the tablet tray and support member 110 may be an integral unit. In addition, the cover and base of the cartridge may be suitably configured so that a protrusion from the cover forms the slot 160. It is therefore contemplated to cover by the present invention, any and all modifications, variations, or equivalents that fall within the spirit and scope of the basic underlying principles disclosed and claimed herein.

What is claimed is:

1. A medication dispensing apparatus comprising:
   at least one radial dispensing medication cartridge, and
   at least one patient verification device operative to activate the radial dispensing medication cartridge in response to verification of patient identification data.

2. The apparatus of claim 1 including a medication cartridge magazine adapted to hold a plurality of radial dispensing medication cartridges.

3. The apparatus of claim 1 wherein the at least one radial dispensing medication cartridge includes a manual activation surface to facilitate manual radial dispensing of medication from the cartridge, and a separate surface adapted to engage an actuator during automated radial dispensing of medication from the cartridge.

4. The apparatus of claim 1 wherein the at least one radial dispensing medication cartridge includes a tablet tray having a plurality of tablet stalls with at least a partially open top and side.

5. The apparatus of claim 4 wherein the tablet tray is a ring shaped tablet tray having a removable tablet retention band.

6. The apparatus of claim 1 wherein the at least one radial dispensing medication cartridge includes a rotational member having a plurality of actuation surfaces that are configured to engage an actuating device to rotationally advance medication in the cartridge.

7. The apparatus of claim 6 wherein the rotational member is a gear and wherein the actuation surfaces include teeth.

8. The apparatus of claim 4 wherein the at least one radial dispensing medication cartridge includes a stall top cover member to cover tablets placed in the stalls.

9. The apparatus of claim 8 wherein the stall top cover member is configured in a flat ring shape.

10. The apparatus of claim 1 wherein the at least one radial dispensing medication dispenser includes a housing having a base and cover wherein the cover includes a tablet retaining wall protruding from a surface thereof.

11. The apparatus of claim 10 wherein the base includes a plurality of ratchet protrusions operatively engageable with a rotating member to restrict rotational movement to facilitate single dose radial dispensing of tablets.

12. The apparatus of claim 1 wherein the at least one radial dispensing medication cartridge includes machine readable medication identification data and a removable tablet tray that includes radially dispensable tablets.

13. The apparatus of claim 6 wherein the at least one radial dispensing medication cartridge includes a base that has a slot and wherein at least a portion of the rotating member extends through the slot to expose engageable surfaces to an actuating member.

14. The apparatus of claim 1 wherein the at least one patient verification device includes an optical character reading device.

15. The apparatus of claim 1 wherein the patient verification device matches prescription data and patient identification data prior to dispensing medication.

16. A medication dispensing apparatus comprising:
- a plurality of radial dispensing medication cartridges operatively affixed to radial dispense tablets to a receptacle;
- a remote communication interface; and
- at least one patient verification device including a processor, operatively coupled to the remote communication interface and operative to activate the radial dispensing medication cartridge in response to verification of patient identification data.

17. The apparatus of claim 16 wherein each of the plurality of radial dispensing medication cartridges includes bar code data containing medication identification data and patient identification data and wherein the apparatus further includes a housing having contained therein a bar code reader positioned to read the bar code data and a window operatively located with respect to the bar code reader such that the bar code reader also reads bar code data located outside the housing.

18. The apparatus of claim 16 wherein the processor obtains at least patient identification data, medication identification data and dosage data from the plurality of radial dispensing medication cartridges and controls the radial tablet dispensing actuator to radially dispense single tablets from at least one cartridge in response to the obtained patient identification data, medication identification data and dosage data.

19. The apparatus of claim 16 wherein the processor actuates at least one of the radially dispensing medication cartridges under control of a remote communication received through the remote communication interface.

20. The apparatus of claim 16 including:
- a sloped cartridge magazine adapted to hold the plurality of radially dispensing medication cartridges;
- a sloped tablet receiving chute operatively located to receive tablets radially dispensed from the cartridges; and
- wherein each of the plurality of cartridges includes an opening therein through which an individual tablet is radially dispensed in response to actuation by the actuator.

21. The apparatus of claim 20 wherein each of the radially dispensing medication cartridges includes a rotational member having a plurality of actuation surfaces that are configured to engage one of the separate actuation members to rotationally advance medication in the cartridge.

22. The apparatus of claim 16 wherein each of the plurality of radially dispensing medication cartridges includes a manual activation surface to facilitate manual radial dispensing of medication from the cartridge, and a separate surface adapted to engage an actuator during automated radial dispensing of medication from the cartridge.

23. The apparatus of claim 16 wherein each of the plurality of radial dispensing medication cartridges includes a tablet tray having a plurality of tablet stalls with at least a partially open top and side.

24. The apparatus of claim 23 wherein the tablet tray is a ring shaped tablet tray having a removable tablet retention band.

25. The apparatus of claim 16 wherein each of the plurality radial dispensing medication cartridge includes a rotational member having a plurality of actuation surfaces that are configured to engage an actuating device to rotationally advance medication in the cartridge.

26. The apparatus of claim 25 wherein the rotational member is a gear and wherein the actuation surfaces include teeth.

27. The apparatus of claim 23 wherein each of the plurality of radial dispensing medication cartridge includes a stall top cover member to cover tablets placed in the stalls.

28. The apparatus of claim 27 wherein the stall top cover member is configured in a flat ring shape.

29. The apparatus of claim 16 wherein each of the plurality of radial dispensing medication dispenser includes a housing having a base and cover wherein the cover includes a tablet retaining wall protruding from a surface thereof.

30. A medication dispensing method comprising the steps of:
- verifying, by an apparatus, whether an authorized recipient is requesting medication for dispense based on at least patient identification data; and
- radially dispensing medication re response to verification of patient identification data.

31. The method of claim 30 wherein the step of radially dispensing includes dispensing tablets from at least one radial dispensing medication cartridge having a tablet tray having a plurality of tablet stalls with at least a partially open top and side.

32. The method of claim 30 wherein the step of radially dispensing includes radially dispensing tablets under control of a processor by rotating a rotational member having a plurality of actuation surfaces that are configured to engage an actuating device to rotationally advance medication in the cartridge.

33. The method of claim 30 including the step of receiving patient verification data from an optical character reading device.

34. The method of claim 30 including the step of matching prescription data and patient identification data prior to dispensing medication.

* * * * *